(No Model.)
M. E. PONTIOUS.
LAWN RAKE AND SWEEPER.
No. 425,695. Patented Apr. 15, 1890.
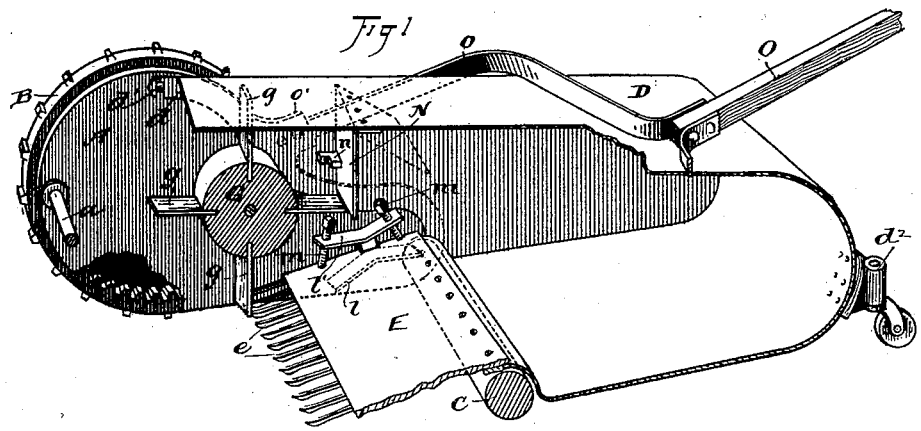
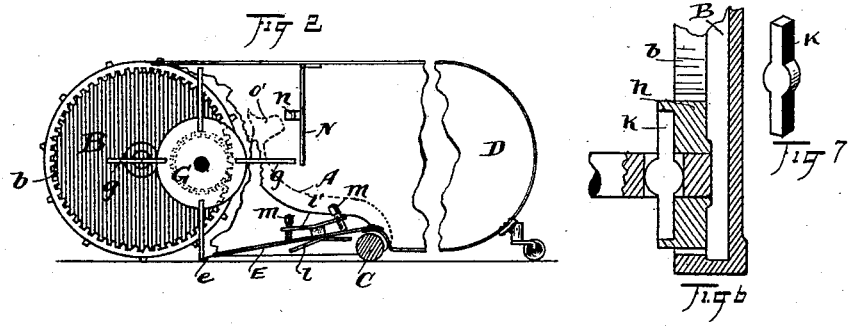
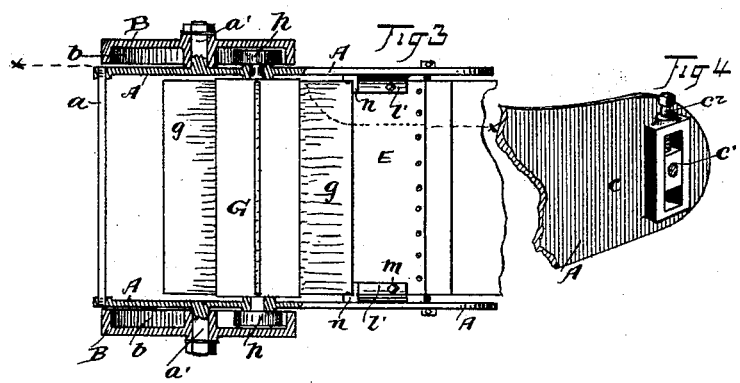
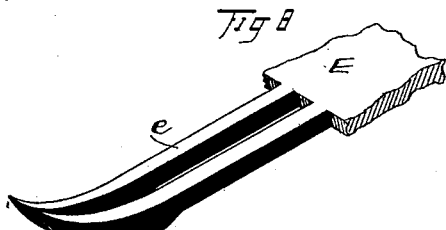
Witnesses
N. S. Amstutz
R. B. Moser
Inventor
M. E. Pontious
By his Attorney H. J. Fisher

UNITED STATES PATENT OFFICE.

MARSHALL E. PONTIOUS, OF CLEVELAND, OHIO, ASSIGNOR OF ONE-HALF TO FRANK L. CODY, OF SAME PLACE.

LAWN RAKE AND SWEEPER.

SPECIFICATION forming part of Letters Patent No. 425,695, dated April 15, 1890.

Application filed January 18, 1890. Serial No. 337,336. (No model.)

*To all whom it may concern:*

Be it known that I, MARSHALL E. PONTIOUS, a citizen of the United States, residing at Cleveland, in the county of Cuyahoga and State of Ohio, have invented certain new and useful Improvements in Lawn Rakes and Sweeps; and I do hereby declare that the following is a full, clear, and exact description of the invention, which will enable others skilled in the art to which it appertains to make and use the same.

My invention relates to lawn rakes and sweeps; and the object of the invention is to provide a machine whereby a lawn may be raked and cleared of mown grass, leaves, or other accumulations and the rakings carried back into a receptacle which moves with the machine and is a part thereof, and which, when filled, may be released and unloaded, all as shown and described, and particularly pointed out in the claims.

In the accompanying drawings, Figure 1 is a perspective view of a machine built according to my invention with portions thereof removed and other portions broken in section so as to disclose the internal mechanism. Fig. 2 is a longitudinal section of the machine, taken substantially on line $x\ x$, Fig. 3. Fig. 3 is a horizontal view of the machine substantially through the center thereof. Fig. 4 shows a rear section of one of the cast-iron sides of the main frame. Fig. 5 is a perspective view of a portion of one of the pinions for driving the brush. Fig. 6 is a vertical section of one of the said wheels, showing the relation of the pinion thereto and the position of the dog to engage the pinion; and Fig. 7 is a detail of the dog shown in position in Fig. 6. Fig. 8 is a section of a rake, showing two of the teeth and part of the table from which the teeth extend.

As will be observed, this machine is constructed of a size and style suitable to be propelled by hand; but of course it may be made larger and heavier, if desired, and adapted to be drawn by animals or propelled by a motor, if that be found convenient. The main frame consists in two metal plates A, which extend forward at either side of the machine, as clearly shown in Figs. 1 and 3, and are connected at the front by connecting-rod $a$ and have trunnions or spindles $a'$ upon their outer sides, upon which are mounted the master-wheels B. These wheels are constructed with ribs or teeth upon their outer surface to make engagement in traction and upon their inner periphery having gear $b$ to give movement to the brush which co-operates with the rake, as hereinafter described. The said plates A extend some distance to the rear in a somewhat tapered form. It will be seen in Fig. 4 that the extremities upon their inner sides are provided with bearings $c$, built in suitable guideways $c'$, formed upon the plate A and adjustable by set-screws $c^2$. Each plate is provided with a corresponding bearing and the associated mechanism, and in these bearings rests a wooden roller C, adjustable up and down in the bearings just described and forming a rear support for the said side plates. Thus the master-wheels at the front and the roller C at the rear serve to carry the said plates and their attachments.

Now, in order that the machine may do the work intended, I employ a receiving and conveying box or receptacle D, the outlines of which are fairly shown in Fig. 1. This box may be of any suitable light material, but preferably is made of sheet-iron, and at its front extremities on either side has arms $d$, constructed to engage lugs or projections $d'$ on the inside of the plates A, and which, when these connections are made, serve to carry the front part of the said box. At the rear I show a caster-wheel $d^2$, preferably one at each corner, for supporting that part of the box, so that both ends of the box or receptacle are supported above the ground and carried along on wheels.

The bottom of the receptable D is bent upward, as seen in Fig. 1, and thence forward to form a rise above and over the roller C. Then along the edge of the portion thus raised I rivet on or secure by other suitable means the table portion of the rake E. The rake proper consists in this portion with the teeth $e$. These teeth are so curved or formed that the points will ride along somewhat above the surface of the earth on their shoulders or bent portions $e'$, leaving the points free to pick up and carry back anything that lies in their way. The rakings are turned back onto the table or platform E, whence they are carried by pressure from the front into the body of the receptacle D.

In order that the rake may be facilitated in its work and the lawn be thoroughly cleaned, I supplement the rake with a brush G. This brush is preferably made of wood, with grooves running longitudinally, in which the brushes $g$ are secured. These brushes need not be heavy in themselves, and, being fastened in quantity in the grooves, something like strong splints or the like would answer the purpose. Rotary motion is given to these brushes through pinions $h$ on the outside of the said plates A, meshing with the gear $b$ in the master-wheels, and these said brushes are designed to rotate, so as to assist in sweeping the lawn and carrying the stuff back over the teeth $e$. These pinions $h$ have teeth $h'$ on their sides, which are engaged by dogs $k$ when turning in the desired direction and causing the roller to revolve with the pinions when moved in a forward direction; but the said teeth and dogs are so set that the roller will stand still when the machine is drawn in the opposite direction, so that there will be rotation of the said brush only when it is desired. It will be understood by this that the pinion is loosely mounted on the spindle which carries the brush and that the dog is fixed to turn therewith, in this instance extending through a slot in the said spindle.

In order that the rake E may be supported at the front in any desired position or elevation, the said plates A are each provided with lateral projections $l\ l'$ on their inside, which said projections are brought close together at their center, from which point they respectively flare to their extremities. The part E of the rake will rest on the apex of the lower extension, and is subject to be depressed on either side thereof and its horizontal position adjusted by screws $m$, one on each end of the upper extension $l'$. When the rake-teeth are to be depressed, the proper adjustment is effected through the screws $m$, as well as when the heel of the rake is to be depressed and the points raised, so that the operator will have perfect control of his machine in this particular and can readily give any dip that he pleases to the rake-teeth. The brushes $g$ in revolving of course will sweep back over the teeth $e$ onto the platform E and assist in carrying the rakings back over said platform into the receptacle.

To prevent the rakings from working back upon the brush when the receptacle is pretty well filled, I employ a swinging gate or shield N, which is attached to the upper part of the receptacle and rests against stops $n$, fixed on the inside of the said box. I show in this instance a handle O, with arms $o$ running forward over the receptacle to the sides thereof, where the said arms are fastened at their ends to ears $o'$ on the sides of the main plates A.

It will be noticed that the side plates A and the master-wheels are set forward of the rake and the revolving and rotary sweep G, but leave a free open way between them, in which the rake and the sweep conjointly operate to clean the lawn the full breadth of the machine.

The roller C serves, as before stated, to carry the rear part of the main frame, and at the same time is made adjustable, so that the elevation above the surface of the frame may be fixed in any desired position. In some instances it will be desirable to run very close to the ground with the rake and in others a considerable distance above the ground. The adjustment of the roller will determine the elevation of the rake bodily, while the set-screws $m$ serve to give the proper dip or pitch to the teeth after the other adjustment has been made.

The front end of the box or receptacle D being provided with hooked arms $d$, engaging lugs $d'$ on the inside of the plates A, and this being the only means of attachment to said plates, the said box is readily detachable to discharge the contents or for any other purpose.

Having thus described my invention, what I claim as new, and desire to secure by Letters Patent, is—

1. The main frame having side plates with master-wheels at the front and a roller at the rear to support the frame, in combination with a box or receptacle attached to said frame at its front and having wheels at the rear, and a rake and rotary sweep, substantially as described.

2. A lawn rake and sweep having a rake with teeth to slide over the lawn and a rotary sweep over the said rake, in combination with a receptacle for the rakings and a shield above the rake and behind the sweep to prevent the sweepings from working out at the front of the receptacle, substantially as described.

3. The side plates provided with adjustable bearings at their rear and a roller in said bearings, and master-wheels with gear on the outside of said plates at their front, in combination with a rotary sweep driven from said master-wheels, a rake, and a receptacle for the sweepings, substantially as described.

4. The rake having a flat platform or plate back of the teeth, the side plates of the main frame having flanges on their inner sides, between which said rake-plate passes, and set-screws in said flanges to set the elevation or depression of the points of the rake, substantially as described.

5. The main frame having supporting-wheels, in combination with a detachable receptacle having wheels secured at the sides of the main frame, a rake, and a revolving sweep, substantially as described.

6. The main frame provided with master-wheels at the front and at the rear an adjustable roller and side flanges for supporting the rake, in combination with a receptacle to carry the rakings, having a bent-up portion at its front and the rake attached thereto, and screws in the said flanges to determine the pitch of the rake, substantially as described.

Witness my hand to the foregoing specification this 11th day of January, 1890.

MARSHALL E. PONTIOUS.

Witnesses:
H. T. FISHER,
NELLIE S. McLANE.